INVENTOR
ANDREW BROOM
BY Young & Thompson
ATTYS.

United States Patent Office 3,331,558
Patented July 18, 1967

3,331,558
RAILWAY RAIL AND WHEEL
Andrew Broom, Johannesburg, Transvaal, Republic of South Africa, assignor to Enaloc (Proprietary) Limited
Filed July 29, 1965, Ser. No. 475,777
Claims priority, application Republic of South Africa, Aug. 4, 1964, 64/3,669
6 Claims. (Cl. 238—148)

ABSTRACT OF THE DISCLOSURE

A rail for a vehicle with flanged wheels has the inner side of its head shaped, in cross-section, as a convex parabolic curve, and the wheel that runs on it has a parabolic tread of greater curvature than the side of the rail. Each side of the head may be convexly parabolically curved.

---

Figures 1, 2:
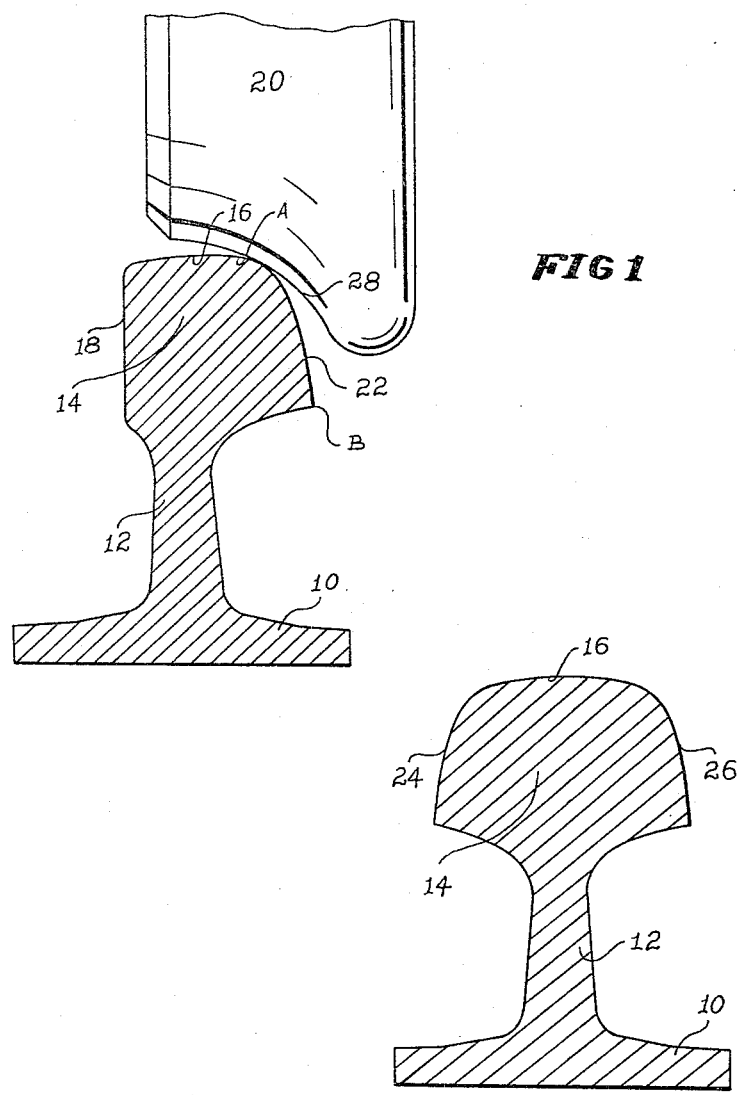

Conventionally, rail heads have a more or less standard pattern. The tread is slightly convex, the sides flat and parallel, and the tread and sides merge at radii. The wheels are coned. Theoretically, of course, there is rolling contact only between each wheel and the rail tread, so that frictional resistance is absent; but in practice this is untrue. The substantial vertical forces of action and reaction between the wheel and the rail cause distortions of both, and expand the theoretical line contact into strip contact; and the necessary play between the rail sides and the wheel flanges permits weaving of the wheels on the rails, which introduces undesirable frictional resistance.

To reduce the frictional forces, in straight-line running the rails are laid with their webs vertical to minimise the zones of contact between wheels and rails. For the locomotive, of course, the zones of contact must be sufficiently large to ensure the adhesion necessary for traction. In the case of the trucks this is not so, and therefore the design of rails and wheels must be a compromise since the locomotives and trucks are obliged to use the same track.

Drivers are instructed as to the speeds at which curves have to be negotiated. These speeds are so calculated, in relation to the track camber, that the optimum contact is maintained as the wheels negotiate the curve. At greater speeds the centrifugal forces exceed the centripetal forces on the wheels and the wheels tend to climb up the rails. With the conventional rail head, contact becomes progressively less until the outer wheel flanges come up against the rail sides and an unbalanced and potentially dangerous torque is built up that can cause derailment.

In braking zones, contact is also diminished due to weaving of the wheels on the track, which decreases the zones of contact and thus the adhesion that is required for good braking.

The object of the invention is to propose a rail and wheel combination that acts to preserve contact between rails and wheels rather more satisfactorily than is the case with the standard rail profile.

The invention provides a combination of a rail with a wheel running on it, the rail having a radiused tread which merges smoothly with a convexly curved portion of the inner side of the rail, that portion being in cross section a portion of a parabola of substantially vertical axis of symmetry; the wheel having a concave tread that is a portion of a parabola of substantially horizontal axis of symmetry.

Two embodiments of the invention are illustrated in the accompanying drawings in which:

FIGURE 1 is a vertical section through one form of rail, according to the invention, with a wheel running upon it, and FIGURE 2 is a vertical section through a second form of rail.

In the drawings, the rail is shown as provided with the usual foot 10 and web 12, and a head 14.

In FIGURE 1, the head has the conventional, radiused upwardly directed tread 16. On the outer side 18, that is the side that is, or is intended to be, away from the wheel 20, the rail head is conventionally shaped. On the inner side the rail head is shaped as a convex parabolic curve 22, shown between the points A and B, merging smoothly with the radiused tread 16. As seen in the drawing, the axis of symmetry of the parabola is substantially vertical.

In FIG. 2, both sides 24, 26 of the head 14 are shaped as convex parabolic curves merging with the radiused tread 16. This form of rail may be reversed end-to-end when the inner side has become unserviceable through wear. The curves at the tow sides may be unsymmetrical, so that the rail may be mounted in whichever way better suits the conditions.

The term "parabolic" is to be understood as including curves closely approximating to a parabola, although not such in the strict mathematical sense.

The or each side need not be composed entirely of a convex parabolic curve in cross-section. The parabola may form part only of the side, the remainder being rectilinear or curvilinear; or even a concave parabolic curve.

The wheel for use with the rails of the invention is one in which the wheel tread is shaped as a concave parabolic curve. This is the wheel illustrated in FIGURE 1 and numbered 20 the axis of symmetry of the parabola being horizontal, as seen in the drawing.

The effects of the structure of the rail of the invention are two-fold. Firstly, as the wheels spiral, the resistance to their lateral outward movement increases as the zone of contact between the rail and the wheel increases in size. Weaving is therefore discouraged. Secondly, on curves, if prescribed speeds are exceeded, the zone of contact between wheel and tread is less steeply reduced than with the standard rail, so that loss of contact is delayed.

I claim:

1. A rail for a vehicle having flanged wheels, the rail having a head with a radiused tread, in which each side of the rail head is or includes in cross-section a convex parabolic curve.

2. The combination of a rail as claimed in claim 1, with a wheel running upon it, the wheel having a parabolic tread the curvature of which is greater than the curvature of the parabolic side of the rail.

3. The combination with a rail for a vehicle with flanged wheels, of a flanged wheel running on the rail; the rail having a head with a radiused tread and the inner side of the rail having or including in cross-section a convex parabolic curve; and the wheel having a parabolic tread the curvature of which is greater than the curvature of the parabolic inner side of the rail.

4. The combination of a rail with a wheel running on it, the rail having a radiused tread which merges smoothly with a convexly curved portion of the inner side of the rail, that portion being in cross section a portion of a parabola of substantially vertical axis of symmetry; the wheel having a concave tread that is a portion of a parabola of horizontal axis of symmetry.

5. The combination of claim 4, in which the rail tread merges smoothly with a convexly curved portion of the outer side of the rail, that last-named portion being in cross section a portion of a parabola of substantially vertical axis of symmetry.

6. The combination of claim 4, in which the rail is symmetrical about its vertical center line.

References Cited

UNITED STATES PATENTS 1,178,031   4/1916   Sellew _____ 238—147

ARTHUR L. LA POINT, *Primary Examiner.*

R. A. BERTSCH, *Assistant Examiner.*